United States Patent [19]

Leonard et al.

[11] Patent Number: 4,804,715

[45] Date of Patent: Feb. 14, 1989

[54] CYANOACETIC ESTER SYSTEM

[75] Inventors: David P. Leonard, Overland Park, Kans.; James H. Truesdale, Kansas City, Mo.; Joseph H. Scherrer, Shawnee Mission, Kans.

[73] Assignee: Cook Paint and Varnish Company, Kansas City, Mo.

[21] Appl. No.: 59,939

[22] Filed: Jun. 9, 1987

Related U.S. Application Data

[63] Continuation-in-part of Ser. No. 900,773, Aug. 26, 1986, abandoned, which is a continuation-in-part of Ser. No. 810,568, Dec. 19, 1985, abandoned.

[51] Int. Cl.$^4$ ................................................ C08F 4/00
[52] U.S. Cl. .................................. 525/245; 525/262; 525/305; 525/445; 525/530
[58] Field of Search ................... 525/10, 38, 295, 113, 525/245, 262, 305, 445, 530

[56] References Cited

U.S. PATENT DOCUMENTS 4,218,515  8/1980  Heckles ............................... 428/474
4,421,847  12/1983  Jung .................................... 430/621

*Primary Examiner*—Christopher Henderson
*Attorney, Agent, or Firm*—Cushman, Darby & Cushman

[57] ABSTRACT

A process for preparing a crosslinked polymer comprises reacting a polycyanoacetic functional monomer or polymer with a poly $\alpha,\beta$-unsaturated ester in the presence of a catalytically effective amount of a metallic catalyst. A crosslinked polymer produced by this process is also described.

16 Claims, No Drawings

CYANOACETIC ESTER SYSTEM

This is a continuation-in-part of our application Ser. No. 900,773 filed Aug. 26, 1986, now abandoned, which, in turn, is a continuation-in-part of our application Ser. No. 810,568, filed Dec. 19, 1985, now abandoned.

FIELD OF THE INVENTION

The present invention relates to crosslinked polymers and to processes for the manufacture thereof. More particularly, the present invention relates to a crosslinked polymer system resulting from the reaction of a cyanoacetate ester and an $\alpha,\beta$-unsaturated ester group.

BACKGROUND OF THE INVENTION

Several disadvantages have been experienced with current ambient and thermosetting compositions and especially those formulated with melamine or urea-formaldehyde resins since during the curing cycle toxic volatiles, including free formaldehyde, are evolved. These compositions are generally cured at elevated temperatures, i.e. at about 275° F. or higher. It has also been observed that while the use of isocyanates offers excellent cure at lower temperatures, i.e. from ambient temperature to about 250° F., nonetheless isocyanates are very toxic and compositions containing them, when cured at ambient or room temperature, produce undesirable side reactions, especially if moisture is present. Epoxy resin containing compositions can cure over a wide temperature range depending upon the type of curing agent employed. However, curing agents for epoxy resins are often very toxic and act as sensitizers to humans. Moreover, their exterior durability is unsatisfactory, limiting their use generally to primer applications.

SUMMARY AND OBJECTS OF THE PRESENT INVENTION

The present invention relates to a process for producing a crosslinked polymer. The process comprises reacting a polyfunctional cyanoacetic monomer or polymer with a polyfunctional $\alpha,\beta$-unsaturated ester in the presence of a catalytic amount of a metallic compound, preferably an organometallic compound.

In one embodiment of the present invention, the process comprises transesterifying a monofunctional alkyl cyanoacetate with a hydroxy functional monomer or polymer having a functionality of two or greater in the presence or not of a transesterification catalyst so as to produce a polyfunctional cyanoacetic monomer or polymer and reacting the thus formed polyfunctional monomer or polymer with a polyfunctional $\alpha,\beta$-unsaturated ester in the presence of a metallic catalyst, preferably an organometallic compound. The present invention also relates to the crosslinked polymers produced by this process.

It has been found that the disadvantages associated with other crosslinking systems can be avoided by the practice of the present invention which provides a crosslinking composition which is curable not only without the production of any toxic fumes or by-products during the cure cycle, but also at low temperatures, i.e. ambient temperature to about 350° F. or higher without adverse side reactions. The quality of coatings produced using the crosslinked compositions of the present invention equals or exceeds that of current coatings in primer application or high durability top coats. The crosslinked compositions of the present invention, when used as a coating composition, also offer the advantage of being compliance coatings which meet the current Environmental Protection Agency's VOC (volatile organic compound) regulations. Coatings or films produced using the crosslinked compositions of the present invention exhibit excellent adhesion, excellent solvent resistance, good flexibility and excellent hardness. These properties are achieved when the polymer system is coated over numerous metallic and plastic substrates such as chromate treated aluminum, zinc and iron phosphate treated steel and various plastics such as polyamides, polycarbonates, ABS, and polyphenylene oxide.

Polymers prepared from the composition of the present invention are useful as coatings for farm implements, automotive top coats, primers, aluminum extrusions, office furnishings and wood products. Industries having a use for such coatings have been in need of a high quality, non-toxic, low temperature cure coating meeting the EPA's VOC regulations and exhibiting good solvent resistance, hardness, flexibility and excellent gloss properties. The present invention fulfills such a need.

DETAILED DESCRIPTION OF THE INVENTION

The present invention provides both a method for preparing the cyanoacetate esters and $\alpha,\beta$-unsaturated ester components for a polymer as well as the crosslinked polymer itself.

In one embodiment of the present invention the process for producing the crosslinked polymer comprises transesterifying a monofunctional alkyl cyanoacetate with a polyhydroxy functional monomer or polyhydroxy functional polymer in the presence or not of a transesterification catalyst so as to produce a polyfunctional cyanoacetate monomer or polymer and, subsequently, reacting the thus formed polyfunctional cyanoacetic monomer or polymer with an $\alpha,\beta$-unsaturated material in the presence of a metallic catalyst, preferably an organometallic catalyst.

When a transesterification catalyst is employed, representative catalysts include, for instance dibutyl tin oxide, paratoluene sulfonic acid, methylsulfonic acid and sodium methoxide. Preferably, dibutyl tin oxide is employed since its use shortens the reaction time and produces lighter colored products.

Monofunctional alkyl cyanoacetates suitable for transesterification include, for instance, methyl cyanoacetatate, ethyl cyanoacetate, propyl cyanoacetate, isopropyl cyanoacetate, n-butyl cyanoacetate, isobutyl cyanoacetate, tert. butyl cyanoacetate, 2-methoxyethyl cyanoacetate, methyl benzyl cyanoacetate and dodecyl cyanoacetate.

Suitable polyhydroxy functional monomers and polymers include for instance diols and polyols. Representative diols include ethylene glycol, propylene glycol, diethylene glycol, 1,6-hexanediol, neopentyl glycol, cyclohexane dimethylol, trimethylpentanediol, 1,4-butanediol and 2,2-dimethyl-3-hydroxy propyl-2,2-dimethyl-3-hydroxypropionate.

Suitable polyols include, for instance, glycerine, trimethylolethane, trimethylolpropane, pentaerythritol and dipentaaerythritol.

Additionally, there can be employed a hydroxy functional acrylic resin such as $\alpha$-methyl styrene/hydroxyethyl acrylate modified with ε-caprolactone [Union Carbide's Tone 100®]/2-ethylhexyl acrylate with weight ratios 35/55/10 respectively, and a styrene/allyl alcohol copolymer sold under the trade designation RJ-100 by Monsanto.

Saturated polyester and alkyd resins can also be employed as the source of polyhydroxy functionality for the said transesterification reaction. Epon resins such as Shell's Epon 1001 and 1004 as well as epoxyesters can be used to transesterify with the monofunctional alkyl cyanoacetates.

Still other polyhydroxy functional materials include acrylic copolymers of 2-hydroxyethylacrylate or 2-hydroxyethyl methacrylate or 2-hydroxypropyl acrylate or 2-hydroxypropyl methacrylate with styrene, vinyl toluene and/or other acrylic ester monomers.

The poly α,β-unsaturated ester employed to crosslink with the polycyanoacetic ester has, preferably, the following structure

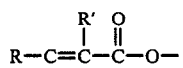

wherein
R represents, independently, hydrogen, methyl or

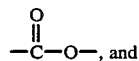, and

R' represents, independently, hydrogen, methyl or

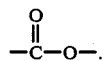.

Exemplary poly α,β-unsaturated ester materials having a functionality of two or more include, for instance, hexanediol diacrylate, hexanediol dimethacrylate, trimethylolpropane triacrylate, trimethylolpropane trimethacrylate, neopentyl glycol diacrylate and the diacrylate and dicrotonate esters of Shell's Epon 828.

Still other useful poly α,β-unsaturated esters include the acrylate, methacrylate, crotonate, maleate and itaconate esters of acrylic copolymers, oil free polyesters, alkyd resins, Epons and epoxy esters. A suitable maleic modified polyester is one having a maleic anhydride to propylene glycol molar ratio of 1.0/1.1 and being reduced to 60% nonvolatiles in methyl amyl ketone. A suitable crotonic acid modified acrylic is one obtained by reacting crotonic acid with an acrylic resin containing glycidyl methacrylate (GMA)/butylacrylate (BA)/methylmethatrylate (MMA)/styrene (S) in weight ratios, respectively, of 25/25/20/30 and having a 60% nonvolatiles content in xylene. A suitable acrylate functional acrylate can be obtained by reacting acrylic acid with a glycidyl methacrylate/butyl acrylate/styrene/methyl methacrylate copolymer wherein the weight ratios are, respectively, 25/25/30/20.

The ratio of the polyfunctional cyanoacetic compound to the poly α,β-unsaturated ester material ranges from 0.03–1.50 to 1.50–0.03 and preferably from about 1.0 to 0.8.

Examples of suitable organometallic compounds for use to catalyze the cyanoacetate-α,β-unsaturated ester reaction include the 2-ethyl hexanoates or octoates of lead, cobalt, manganese, zinc, calcium, iron, zirconium, potassium, and vanadium; the naphthenates of lead, cobalt, manganese, zinc, calcium, iron, potassium and cerium; the tallates of lead, cobalt, manganese, calcium and iron; and the neodecanoates, isononanoates and heptanoates of calcium, cobalt, lead, manganese, zinc, zirconium and iron; or a mixture thereof. Also included are the metallic acetoacetonates of manganese (II), (III), cobalt (II), (IV), chromium, lead, potassium, etc, and mixtures thereof.

The amount of catalyst employed in the present process will range, for example, between about 0.02 percent and about 0.80 percent and, preferably, between about 0.04 percent and 0.25 percent, based on total vehicle solids. The amount and type of organometallic catalyst will depend on the reactivity of the cyanoacetic group with the α,β-unsaturated ester material, whether an air dry or bake system is used, as well as the time and temperature of the bake cycle.

The curing step may be conducted between room temperature and 350° F., preferably between 250° and 300° F.

EXAMPLES

The following non-limiting examples illustrate the present process. Examples I–VII illustrate exemplary polyfunctional cyanoacetic materials and the process for their preparation. Example I.

A one liter reaction vessel equipped with a thermometer, and inert gas delivery tube, a Barrett distilling receiver and a water condenser, is charged with 236 grams of 1,6-hexanediol, 396 grams of methyl cyanoacetate and 3 grams of dibutyl tin oxide. The mixture is heated under a light nitrogen blanket to 95° C. at which point methanol starts to distill over. The temperature increases as the methanol is removed to a maximum of 135° C. The nitrogen blanket is replaced by a nitrogen blow to remove the last traces of methanol. The product, hexanediol dicyanoacetate has a N Gardner-Holdt viscosity at 100% nonvolatiles and a 126 equivalent weight.

EXAMPLE II

Trimethylolpropane tricyanoacetate was prepared by the same process as in Example I. 268 grams of trimethylolpropane was reacted with 594 grams of methyl cyanoacetate and 6 grams of dibutyl tin oxide. The product was semi-solid at 100% nonvolatiles and has a 112 equivalent weight.

EXAMPLE III

Using the method of Example I, 526 grams of Monsanto's styrene/allyl alcohol copolymer, RJ-100, were reacted with 173 grams of methyl cyanoacetate and 1.4 grams of dibutyl tin oxide. The product was reduced to 70% nonvolatiles in a 1:1 mixture of methyl isobutyl ketone and xylene. The viscosity of this material was Z4+ and has a 370 equivalent weight of solids.

EXAMPLE IV

A cyanoacetic functional alkyd resin was prepared by first reacting 204.8 grams of coconut oil and 51.2 grams pentaerythritol in the presence of 0.8 gram calcium octoate. After alcoholysis takes place 216.8 grams of phthalic anhydride and 139.2 grams of pentaerythritol are added. 40 grams of xylene were then added to remove the water by azeotropic distillation. After this alkyd portion is reacted down to a maximum acid number of ten, the alkyd is cooled to 100° C. and 187.2 grams of methyl cyanoacetate and 2.0 grams of dibutyl tin oxide are added. The by-product of the transesterification is removed as in Example I. The resin, reduced to 59% nonvolatiles in xylene, has a Z3-viscosity and a 377 equivalent weight on solids.

EXAMPLE V

A cyanoacetic functional acrylic was prepared by first reacting 106.5 grams of styrene (S), 138.6 grams of butyl methacrylate (BMA), 25.0 grams of butyl acrylate (BA) and 145.8 grams of hydroxy ethylacrylate (HEA) in the presence of 203.4 grams of xylene and 36.6 grams of di-tertiary-butyl peroxide. The poly hydroxy functional acrylic resin that is formed is then reacted with 140 grams of methyl cyanoacetate and 4 grams of dibutyl tin oxide. The methanol was removed by the procedure in Example I. The cyanoacetic functional acrylic, at 66% nonvolatiles, has a Z5 viscosity and a 427 equivalent weight.

EXAMPLE VI

A cyanoacetic functional oil free polyester is prepared by first reacting 326.4 grams of trimethylpentanediol, 27.2 grams of trimethylol propane, 280 grams of isophthalic acid and 0.8 grams of butyl stannoic acid. The mixture is esterified to a maximum acid number of ten. The resin is cooled to 100° C. and 164.8 grams of methyl cyanoacetate and 0.8 gram of dibutyl tin oxide are added. The methanol was removed as in Example I. The cyanoacetic functional polyester has a S+ viscosity at 68% nonvolatiles in xylene and a 412 equivalent weight.

EXAMPLE VII

A cyanoacetic functional epoxy ester was prepared by first reacting 393.6 grams of tall oil fatty acid with 267.2 grams of Shell Chemical's Epon 828. The mixture is reacted to a maximum acid number of three. The epoxy ester is cooled to 120° C. at which time 138.4 grams of methyl cyanoacetate and 0.8 gram of dibutyl tin oxide are added. The methyl alcohol was removed as in Example I. The resin has a V+ viscosity at 80.5% nonvolatiles in xylene and a 540 equivalent weight.

Examples VIII-XVIII demonstrate the curing properties of the various polyfunctional cyanoacetate materials with poly $\alpha,\beta$-unsaturated esters. The stoichiometric ratio of the blend is 1:1 with a catalyst level of 0.12% manganese octoate on total solids. Films (0.8–1.1 mil dry) were baked at 250° F. and/or 300° F. or thirty minutes on cold rolled steel panels.

EXAMPLES VIII-XVIII

| $\alpha,\beta$-Unsaturated Ester | Cyanoacetate Example | Bake Temp. (°F.) | MEK Resistance | Film Hardness | Reverse Impact, in. lb. |
|---|---|---|---|---|---|
| Itaconate Polyester (A) | I | 250 | 35 | 3B | 100 |
|  |  | 300 | 50 | HB-F | 100 |
| (A) | III | 250 | 15 | HB | 20 |
|  |  | 300 | 50 | H | 20 |
| Crotonate Functional Acrylic (B) | III | 300 | 15 | HB | 20 |
| Trimethylol propane triacrylate (TMPTA) | IV | 300 | 30 | 2B-B | 20 |
| (A) | IV | 300 | 50 | HB-F | 20 |
| Acrylate Functional | IV | 300 | 35 | B | 20 |

-continued

| $\alpha,\beta$-Unsaturated Ester | Cyanoacetate Example | Bake Temp. (°F.) | MEK Resistance | Film Hardness | Reverse Impact, in. lb. |
|---|---|---|---|---|---|
| Acrylic (C) |  |  |  |  |  |
| TMPTA | V | 250 | 15 | HB | 20 |
|  |  | 300 | 50 | F | 20 |
| (A) | V | 250 | 3 | HB | 20 |
|  |  | 300 | 50 | H | 20 |
| (C) | V | 300 | 38 | H-2H | 20 |
| (A) | VI | 300 | 50 | HB | 20 |
| (C) | VI | 300 | 30 | HB | 20 |

(A) Itaconic Acid/2,2-dimethyl-3-hydroxypropyl, 2,2-dimethyl-3-hydroxy propionate (5/4 molar ratio) polyester, 350 equivalent weight.
(B) Crotonic acid reacted with a glycidyl methacrylate functional acrylate resin containing a 25/25/30/20 ratio of glycidyl methacrylate/butyl acrylate/styrene/methyl
(C) Acrylic acid reacted with a glycidyl methacrylate functional acrylic resin containing a 25/25/30/20 ratio of glycidyl methacrylate/butyl acrylate/styrene/methyl methacrylate respectively, 640 equivalent weight.

The following examples demonstrate the cure and film properties of two gloss enamels based on cyanoacetic functional resins.

EXAMPLE XVIII

The cyanoacetic modified alkyd of Example IV was blended 1:1 on an equivalent basis with the itaconic acid/2,2-dimethyl-3-hydroxypropyl 2,2-dimethyl-3-hydroxypropionate polyester (A). The mixture was pigmented to a gloss white enamel with a PVC of 18% at a volume solids of 45%. The system was catalyzed with 0.06% manganese octoate and 0.10% zinc octoate. The coating was applied four mils wet to a cold rolled steel panel and baked for 20 minutes at 300° F. The coating had the following properties:
Gloss—84/60°, 64/20°
Pencil Hardness—F
Impact—100 in. lbs. reverse
MEK resistance—50 double rubs
Tape Adhesion—Excellent—no loss

EXAMPLE XIX

The cyanoacetic functional epoxy ester of Example VII was blended 1:1 on an equivalent basis with a 1,6-hexanediol itaconate polyester. The polyester was prepared by reacting four moles of 1,6-hexanediol with three moles of itaconic acid to a maximum acid number of two. The resin has a Z viscosity at 92.5% nonvolatiles in xylene and a 271 equivalent weight.

The cyanoacetic modified epoxy ester/itaconate polyester blend was pigmented to a semi-gloss black baking enamel. The enamel was formulated at a PVC of 16.4% at a volume solids of 54.14%. The coating was catalyzed with 0.06% manganese metal and 0.010% zinc metal based on vehicle solids. The coating was sprayed onto a cold rolled steel panel and baked for 20 minutes at 300° F. The coating had the following properties:
Gloss—69/60°, 26/20°
Pencil Hardness—B
Impact—40 in. lbs. reverse
MEK Resistance—50 double rubs
Tape Adhesion—Excellent—no loss The Chemical Abstract Service registry number for Epon 1001, 1004 and 828 is 25068-38-6. Their chemical formula is reported to be $(C_{15}H_{16}O_2 \cdot C_3H_5ClO)_x$. Their ring system data is
(01)(nr=01; sr=3; ar=C20.01; fr=OC2.01; ir=1-30-1)
(02)(nr=01; sr=6; ar=fr=C6.01; ir=46-150-18)
Their Chemical Abstracts names are;

HP=Phenol (9Cl), SB=4,4'-(1-methylethylidene)-bis-NM=polymer with (chloromethyl)oxirane.

Synonyms include: 2,2-bis(p-hydroxyphenyl)-propaneepichorohydrin condensate.

What is claimed is:

1. A process for preparing a crosslinked polymer comprising reacting a polycyanoacetic functional polymer with a poly α,β-unsaturated ester in the presence of a catalytically effective amount of an organometallic catalyst, said organometallic catalyst being a carboxylate selected from the group consisting of (1) the 2-ethyl hexanoates or octoates of lead, cobalt, manganese, zinc, calcium, iron, zirconium, lanthanum, chromium, potassium or vanadium; (2) the naphthenates of lead, cobalt, manganese, zinc, calcium, iron, potassium or cerium; (3) the tallates of lead, cobalt, manganese, calcium or iron; (4) the neodecanoates of calcium, cobalt, manganese, lead, zinc, zirconium or iron; (5) the isononanoates of calcium, cobalt, lead, manganese, zinc, zirconium or iron; and (6) the heptanoates of calcium, cobalt, lead, manganese, zinc, zirconium or iron; and mixture thereof.

2. A process for preparing a crosslinked polymer comprising reacting a polycyanoacetate functional polymer with a poly α,β-unsaturated ester in the presence of, as an organometallic catalyst, an acetoacetonate of manganese, cobalt, chromium and potassium, or mixtures thereof.

3. The process of claim 1 wherein said polycyanoacetic functional polymer is prepared by transesterifying a monofunctional alkyl cyanoacetate with a hydroxy functional material having a functionality of at least two.

4. The process of claim 3 wherein the transesterification reaction is carried out in the presence of a catalytically effective amount of a transesterification catalyst.

5. The process of claim 4 wherein said transesterification catalyst is dibutyl tin oxide, paratoluene sulfonic acid, methyl sulfonic acid or sodium methoxide.

6. The process of claim 1 wherein the ratio of polycyanoacetic functional polymer to the poly α,β-unsaturated ester ranges from 0.03-1.50 to 1.50-0.03.

7. The process of claim 1 wherein the ratio of polycyanoacetic functional polymer to the poly α,β-unsaturated ester ranges from about 1.0 to 0.8.

8. The process of claim 3 wherein said monofunctional alkyl cyanoacetate is methyl cyanoacetate, ethyl cyanoacetate, propyl cyanoacetate, n-butyl cyanoacetate, isobutyl cyanoacetate or 2-methyoxyethyl cyanoacetate.

9. The process of claim 3 wherein said hydroxy functional material having a functionality of at least two is a diol; a polyol; a copolymer of a hydroxy alkyl acrylate or methacrylate with one or more of styrene, vinyl toluene or another acrylic ester monomer; a saturated polyester resin; an alkyd resin; or an epoxy resin.

10. The process of claim 1 wherein said poly α,β-unsaturated ester has a unit of the formula

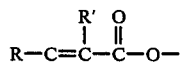

wherein

R represents, independently, hydrogen, methyl or

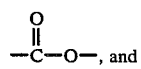, and

R' represents, independently, hydrogen, methyl or

.

11. The process of claim 1 wherein said poly α,β-unsaturated ester is hexanediol diacrylate, hexanediol dimethacrylate, trimethylolpropane triacrylate, trimethylolpropane trimethacrylate, neopentyl glycol diacrylate and the diacrylate and dicrotonate esters of Shell's Epon 828.

12. The process of claim 1 wherein said poly α,β-unsaturated ester is the acrylate, methacrylate, crotonate, maleate or itaconate ester of an acrylic copolymer, an oil free polyester, an alkyd resin or an epoxy resin.

13. A process for preparing a crosslinked polymer from a polycyanoacetic functional polymer and a poly α,β-unsaturated ester comprising (a) transesterifying a monofunctional alkyl cyanoacetate with a hydroxy functional material having a functionality of at least two so as to produce a polycyanoacetic functional polymer, and (b) reacting said polycyanoacetic functional polymer with a poly α,β-unsaturated ester in the presence of an organometallic catalyst, said organometallic catalyst being a carboxylate selected from the group consisting of (1) the 2-ethylhexanoate or octoate of lead, cobalt, manganese, zinc, calcium, iron, zirconium, lanthanum, chromium, potassium or vanadium; (2) the naphthenates of lead, cobalt, manganese, zinc, calcium, iron, potassium or cerium; (3) the tallates of lead, cobalt, manganese, calcium or iron; (4) the neodecanoates of calcium, cobalt, manganese, lead, zinc, zirconium or iron; (5) the isononanoates of calcium, cobalt, lead, manganese, zinc, zirconium or iron; and (6) the heptanoates of calcium, cobalt, lead, manganese, zinc, zirconium or iron; and mixtures thereof.

14. The process of claim 13 wherein said organometallic catalyst is present in an amount ranging from 0.20 to 0.80 percent based on total vehicle solids.

15. The process of claim 1 wherein said organometallic catalyst is present in an amount ranging from 0.02 to 0.80 percent based on total vehicle solids.

16. A process for preparing a crosslinked polymer comprising reacting a polycyanoacetic functional polymer with a poly α,β-unsaturated ester in the presence of an organometallic catalyst, said polycyanoacetic functional polymer being prepared by transesterifying a monofunctional alkyl cyanoacetate with a hydroxy functional material (1) having a functionality of at least two, and (2) being (i) a diol, (ii) a polyol, (iii) a copolymer of a hydroxy alkyl acrylate or methacrylate with one or more of styrene, vinyl toluene or another acrylic ester monomer, (iv) a saturated polyester resin, (v) an alkyl resin, (vi) an epoxy resin, and said organometallic catalyst is a carboxylate selected from the group consisting of (1) the 2-ethyl hexanoates or octoates of lead, cobalt, manganese, zinc, calcium, iron, zirconium, lanthanum, chromium, potassium or vanadium; (2) the naphthenates of lead, cobalt, manganese, zinc, calcium, iron, potassium or cerium; (3) the tallates of lead, cobalt, manganese, calcium or iron; (4) the neodecanoates of calcium, cobalt, manganese, lead, zinc, zirconium or iron; (5) the isononanoates of calcium, cobalt, lead, manganese, zinc, zirconium or iron; and (6) the heptanoates of calcium, cobalt, lead, manganese, zinc, zirconium or iron; and mixtures thereof.

* * * * *